United States Patent [19]

Obermayer et al.

[11] Patent Number: 4,989,552
[45] Date of Patent: Feb. 5, 1991

[54] AIR-COOLED INTERNAL COMBUSTION ENGINE

[75] Inventors: Bertram Obermayer; Wolfgang Kling, both of Graz, Austria

[73] Assignee: AVL Gesellschaft für Verbrennungskraftmaschinen und Messtechnik m.b.H., Prof.Dr.Dr.h.c. Hans List

[21] Appl. No.: 470,588

[22] Filed: Jan. 26, 1990

[30] Foreign Application Priority Data

Feb. 7, 1989 [AT] Austria .................................. 257/89

[51] Int. Cl.⁵ .............................................. F01P 7/06
[52] U.S. Cl. .................... 123/41.66; 123/41.7; 123/563
[58] Field of Search ............... 123/41.31, 41.33, 41.56, 123/41.63, 41.65, 41.66, 41.69, 41.7, 563; 60/599

[56] References Cited

U.S. PATENT DOCUMENTS

| | | | |
|---|---|---|---|
| 1,930,508 | 10/1933 | Conant | 123/41.69 |
| 2,321,097 | 6/1943 | Mills | 123/563 |
| 2,350,784 | 6/1944 | Löhner et al. | 123/563 |
| 2,573,544 | 10/1951 | Colby | 123/41.69 |
| 2,611,346 | 9/1952 | Sonderegger | 123/41.7 |
| 4,124,979 | 11/1978 | Tholen et al. | 60/599 |

FOREIGN PATENT DOCUMENTS 2402154   8/1974   Fed. Rep. of Germany ..... 123/41.7

Primary Examiner—Noah P. Kamen
Attorney, Agent, or Firm—Watson, Cole, Grindle & Watson

[57] ABSTRACT

In an air-cooled internal combustion engine with one or more cylinder banks, a cooling-air blower and an intercooler for the air charge, the intercooler—as seen in the flow direction of the cooling-air—is placed directly in front of the cylinder bank, i.e. preferably over its entire length. The intercooler is subject to the full stream of cooling-air passing through the cylinder bank. A comparison of conventional designs and the arrangement described by the invention shows that the power requirements of the blower are reduced by as much as 15% in conventional assemblies, and by even 20% in special-purpose vehicles as described below.

3 Claims, 2 Drawing Sheets

AIR-COOLED INTERNAL COMBUSTION ENGINE

BACKGROUND OF THE INVENTION

This invention relates to an air-cooled internal combustion engine with at least one cylinder bank, a cooling-air blower and a heat exchanger for the air charge the heat exchanger being located directly in front of the cylinder bank, i.e., preferably over its entire length, as seen in the flow direction of the cooling air.

DESCRIPTION OF THE PRIOR ART

In conventional designs of this kind the most frequently used variant is parallel cooling of the cylinder bank and the heat exchanger for the air charge, i.e., partial streams of the cooling air delivered by the blower pass through both the cylinder bank and the heat exchangers for the air charge and the engine oil. For adequate distribution of the streams of cooling air such engines usually require throttles in the area of the heat exchangers in order to compensate for the pressure drop, which is smaller in the heat exchangers than in the cylinder banks. In addition, the stream of cooling-air must be regulated in the cylinder space of the cylinder bank(s) in order to prevent excessive cooling of this area. In U.S. Pat. No. 4,124,979 a variant of this type of internal combustion engine is described in which the air delivered by the blower passes through the heat exchangers for the air charge as well as through the cylinder banks. The partial streams flowing through the heat exchangers are regulated by flaps. The part of the cooling-air not regulated by flaps is delivered to the cylinders past the heat exchangers.

In another variant of the above type of internal combustion engine the heat exchanger for the air charge is located in front of the blower. In this arrangement the cylinder bank and the heat exchanger for the engine oil are subject to cooling air of a higher temperature. Due to the higher temperature of the cooling air upon its entrance into the engine oil cooling unit and the cylinder bank, the stream of cooling-air must be increased in order to ensure that the proper amount of heat is dissipated. As a consequence, the routing of the air charge is rather complicated in this type of design, necessitating a lot of space.

SUMMARY OF THE INVENTION

It is an object of the invention to arrange the heat exchangers for the air charge and the engine oil in such a way as to reduce the volume of the air stream, and thus the loss of pressure, above all in automotive vehicles with limited space for the delivery and dissipation of cooling-air, and thus to reduce the power requirements of the blower.

This object is achieved in the invention by subjecting the heat exchanger to the entire volume of cooling-air flowing through the cylinder bank, and, if necessary, by directing a partial stream of the cooling-air through a heat exchanger for the engine oil. In such arrangements, the temperature gradiant of the cooling-air upon its exit from the heat exchanger, and thus its entrance into the cylinder bank is inversely proportional to the necessary dissipation of heat from the cylinder bank, with differences between entry and exit temperature of the cooling-air of up to 40° C. being possible in supercharged engines.

Due to the smaller difference in temperature between cooling air and cylinder bank, the necessary increase in the overall flow of cooling air for the cylinder bank is approximately the same here as in the arrangement discussed above, i.e., with the heat exchanger for the air charge located in front of the blower inlet.

This temperature/time curve of the cooling-air will provide a more balanced ratio of the volume of cooling-air between cylinder head and cylinder space, reducing it from 2:1 to 1.6:1 approximately, such that flow-regulation in the area of the cylinders may be reduced or eliminated altogether.

In the arrangement of the invention a heat exchanger for the engine oil is provided as in conventional variants, i.e., in a parallel circuit. If the heat exchanger for the air charge is located in front of the blower inlet, the heat exchanger for the engine oil is subjected to higher temperatures than in the other variants. In this instance the volume of cooling-air for the heat exchanger for the engine oil must be increased.

By placing the heat exchanger for the air charge as proposed by the invention, a compact engine design is achieved, which is of particular advantage in the use of special-purpose vehicles, for example, armoured vehicles with restricted engine space.

A comparison of conventional assemblies and an arrangement according to the invention shows that the power requirements of the blower are reduced by as much as 15% in conventional vehicles and up to 20% in special-purpose vehicles as described above.

In an assembly as described by the invention the cooling-air blower may be placed in the air stream in two ways; either taking in air from the atmosphere and pushing it into the engine through the heat exchanger, or taking in air from the heat exchanger and the engine, and discharging it into the open. In a preferred variant of the invention the hot air charge coming from the compressor will enter the heat exchanger in the thermally less critical area of the cylinders passing through it in the direction of the cylinder axis towards the cylinder heads, which are subject to high thermal loads. In this manner the blower may be kept small, since the cooling air is utilized most economically.

In the instance of V-type engines the invention proposes that a heat exchanger for the air charge be provided on the outside of each cylinder bank in addition to a blower in the V-space, which latter will suck in cooling air through the engine and discharge it to the atmosphere. In the course of this process a partial stream will flow through each of the heat exchangers for the air charge and, if applicable another partial stream through the heat exchanger for the engine oil.

BRIEF DESCRIPTION OF THE DRAWINGS

Following is a more detailed description of the invention as illustrated by the accompanying drawings, in which FIG. 1 gives a schematical view of an internal combustion engine according to the invention as a section along line I—I in FIG. 2, and FIG. 2 a corresponding view from above, as a partial section, and FIG. 3 gives another variant, as a front view.

Identical parts have identical reference numbers.

DETAILED DESCRIPTION OF THE PREFERRED EMBODIMENTS

Figure 1:
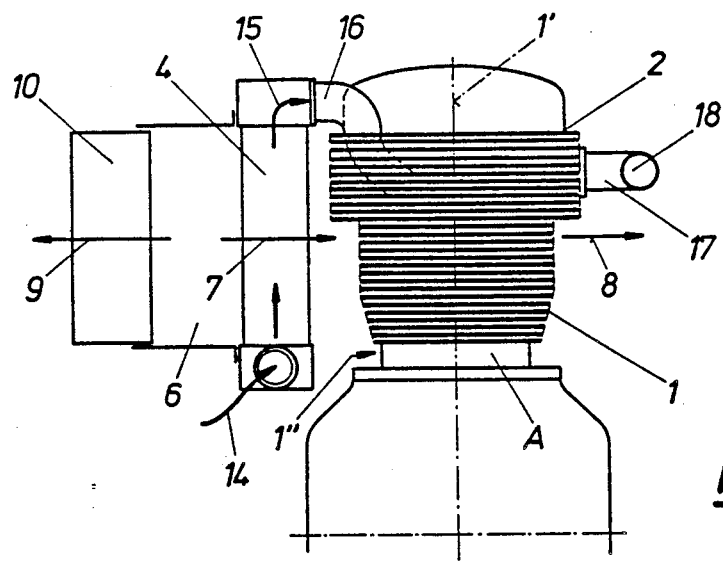
Figure 2:
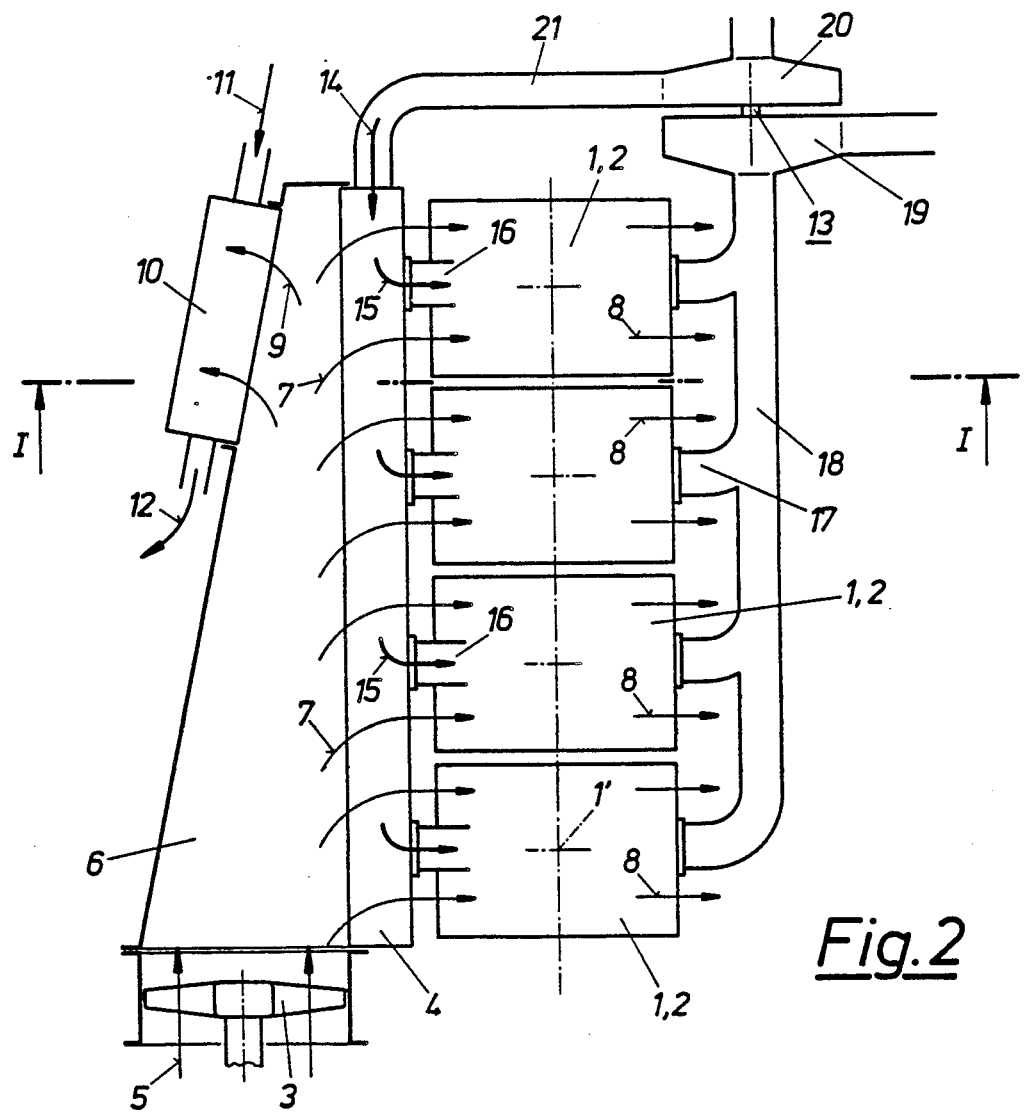

The air-cooled internal combustion engine of the invention presented in FIGS. 1 and 2 has four cylinder units arranged in line A, each comprising a cylinder 1 and a cylinder head 2. Die cooling air is delivered by the blower 3, which takes in air from the atmosphere (arrows 5), pushing it through the heat exchanger 4 and the cylinder units 1, 2 via the inlet housing 6, in a partial stream indicated by arrows 7. The air which is discharged into the atmosphere is indicated by arrows 8. Another partial stream, which is represented by arrow 9, passes through the heat exchanger 10 for the engine oil flowing in in the direction of arrow 11 and leaving it in the direction of arrow 12. As indicated by arrows 14 and 15, the path of the air charge delivered by the exhaust gas turbocharger 13 first leads into the heat exchanger 4 in the area 1" of the first cylinder unit 1,2 and then into the cylinder heads 2 via the intake passages 16.

The burnt exhaust gases leave the cylinder units 1, 2 through the pipes 17 and are collected in the exhaust manifold 18 leading towards the exhaust gas turbine 19 of the exhaust gas turbocharger 13. The compressor part of the exhaust gas turbocharger 13 has the reference number 20. It takes in air from the atmosphere and delivers it into the heat exchanger via the pressure line 21, as described above.

Figure 3:
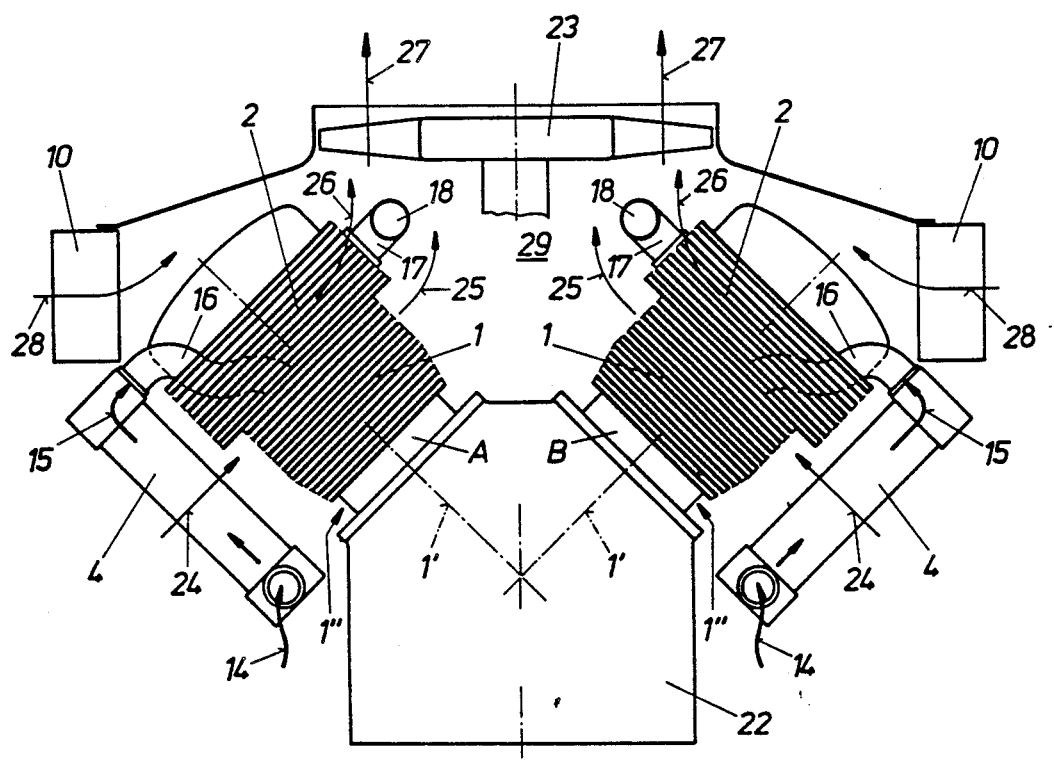

In the variant shown in FIG. 3 the two cylinder units 1, 2 are arranged in a V on the engine housing 22. In this instance the cooling-air is sucked in from the atmosphere by the blower 23, passing through the cylinders 1 and cylinder heads 2 of banks A and B (cf. arrows 25), and flowing back into the open via the V-space 29 (cf. arrows 27). Two further partial streams are sucked through the heat exchangers 10 by the blower 23 in the direction indicated by arrows 28. In flow direction of the cooling air the heat exchangers 4 for the air charge again are located in front of the two cylinder banks and extend over all cylinder units of the cylinder banks A and B. Once again, the air charge enters the heat exchangers 4 in the lower area of the cylinder 1, flowing through the latter towards the cylinder head 2. From this area of the heat exchanger the cooled air charge enters the cylinders 1 through the intake passages 16 in the direction of arrows 15.

Instead of the blower 23, which is used for sucking the cooling air through the engine, a pressure fan may be employed, in which case the heat exchangers 4 for the air charge are situated in the v-space 29, i.e., on the inside of the cylinder banks A, B. The flow through the oil cooling units 10, which may be located wherever desirable, is directed from the V-space towards the exterior.

We claim:

1. An air-cooled internal combustion engine which comprises:

two elongated cylinder banks arranged in a Vconfiguration to define a space therebetween, each cylinder bank including cylinder units which consist of cylinders and cylinder heads, each of said two cylinder banks defining an inner side facing said space and an outer side opposite said inner side, an elongated intercooler extending along the outer side of each of said cylinder banks for supplying an air charge from a compressor of an exhaust gas turbocharger to the cylinders of each cylinder unit, and a blower located in said space between said cylinder banks for causing external cooling air to flow into said engine, the entirety of said external cooling air which passes through said cylinder banks first passing said intercoolers.

2. An air-cooled internal combustion engine according to claim 1, including a heat exchanger for engine oil, and wherein said blower creates a partial flow of external cooling air which passes through said heat exchanger.

3. An internal combustion engine according to claim 1, wherein said intercoolers are constructed such that said air charge coming from said compressor of said turbocharger enters said intercoolers in a thermally less critical area of said cylinders of said cylinder banks, and passes through said intercoolers in a direction of the axis of said cylinders towards said cylinder heads, which are subject to high thermal loads.

* * * * *